US006720283B2

(12) United States Patent
Ding et al.

(10) Patent No.: US 6,720,283 B2
(45) Date of Patent: Apr. 13, 2004

(54) ACTIVATED CARBON SUPPORTED COBALT BASED CATALYST FOR DIRECT CONVERSION OF SYNTHESIS GAS TO DIESEL FUELS

(75) Inventors: Yunjie Ding, Dalian (CN); Wenping Ma, Dalian (CN); Liwu Lin, Dalian (CN)

(73) Assignee: Dalian Institute of Chemical Physics, Dalian (CN)

( * ) Notice: Subject to any disclaimer, the term of this patent is extended or adjusted under 35 U.S.C. 154(b) by 130 days.

(21) Appl. No.: 10/034,206

(22) Filed: Jan. 3, 2002

(65) Prior Publication Data

US 2003/0121826 A1 Jul. 3, 2003

(51) Int. Cl.$^7$ ............................ B01J 21/18; B01J 23/02; B01J 23/40; C07C 27/00; C07C 27/06
(52) U.S. Cl. ...................... 502/184; 502/182; 502/185; 518/715; 518/717
(58) Field of Search ................................ 502/182, 184, 502/185; 518/715, 717

(56) References Cited

U.S. PATENT DOCUMENTS

| 4,977,126 | A | * | 12/1990 | Mauldin et al. | ............. 502/242 |
|---|---|---|---|---|---|
| 5,502,019 | A | * | 3/1996 | Augustine et al. | ........... 502/314 |
| 5,780,381 | A | * | 7/1998 | Wilson et al. | ............... 502/308 |
| 6,417,133 | B1 | * | 7/2002 | Ebner et al. | ................ 502/185 |
| 2003/0060361 | A1 | * | 3/2003 | Chen et al. | .................. 502/180 |
| 2003/0119665 | A1 | * | 6/2003 | White | ......................... 502/180 |

* cited by examiner

Primary Examiner—C. Melissa Koslow
Assistant Examiner—Patricia L. Hailey
(74) Attorney, Agent, or Firm—Venable LLP; James R. Burdett

(57) ABSTRACT

Diesel fuels or blending stocks having high cetane number are produced from non-shifting Fischer-Tropsch processes, which directly convert carbon monoxide and hydrogen to diesel distillates over activated carbon supported cobalt based Fischer-Tropsch catalysts. The activated carbon supported cobalt based catalysts comprise a substantially high dispersion of at least one of a zirconium component, an cerium component, a ruthenium component or a potassium component in porous carbon and elemental cobalt either deposited thereon or substantially uniformly dispersed therein, wherein the concentration of activated carbon in the catalyst is from about 20 to about 90 percent by weight, based on the weight of the catalyst, the concentration of elemental cobalt in the catalyst is from about 4 to about 50 percent by weight, based on the weight of the catalyst, the total concentration of the zirconium component, the cerium component, or a combination thereof in the catalyst is from about 0.01 to about 20 percent by weight, based on the weight of the catalyst and calculated as the elemental metal or metals, and the total concentration of the ruthenium component, the potassium component, or a combination thereof in the catalyst is from about 0.01 to about 5.0 percent by weight, based on the weight of the catalyst and calculated as the elemental metal or metals. Activated carbon carrier has a surface area in the range of about 200–2000 m$^2$/g, preferably 800–1500 m$^2$/g, and a pore volume of 0.3 to 2.0 ml/g, preferably 0.35 to 0.75 ml/g, a distribution of pore diameter of 4 to 1000 Å, preferably 5 to 500 Å.

13 Claims, No Drawings

ACTIVATED CARBON SUPPORTED COBALT BASED CATALYST FOR DIRECT CONVERSION OF SYNTHESIS GAS TO DIESEL FUELS

FIELD OF THE INVENTION

This invention relates to activated carbon supported cobalt based catalysts and their use in the process for the conversion of synthesis gas to diesel fuels with nil sulfur, nil nitrogen or nil aromatics.

BACKGROUND OF THE INVENTION

The search for processes to provide alternate feedstocks for fuels, and particularly high quality diesel fuels, has been prompted by the potential shortage of traditional petroleum reserves, and increasing instability of international hydrocarbon resources.

One approach to the problem has been the utilization of the Fischer-Tropsch synthesis in producing paraffins having selective product distribution as well as containing a few olefins, in varying paraffin/olefin ratios, depending on the catalyst composition, pretreatment procedures, and reaction conditions. Catalysts having various combinations of elements have been tested in the past, and the chief constituent element of the catalyst has been nickel, cobalt, iron and ruthenium.

U.S. Pat. No. 4,478,954 discloses a catalyst for the production of $C_2$–$C_4$ olefins from carbon monoxide and hydrogen consisting of 5–50 wt % iron metal and 20–90 wt % an activated carbon support, promoted by magnesium and chromium metals.

U.S. Pat. No. 4,542,122 states that a cobalt catalyst, especially a thoria promoted cobalt catalyst, formed by dispersing the cobalt, or cobalt and thoria, upon a titania or titania-containing support wherein the titania support is one having a rutile:anatase ratio of at least about 2:3. By passing methanol, or a mixture of carbon monoxide and hydrogen over the catalyst at reaction conditions, a distillate fuel consisted principally of a mixture of linear paraffin and olefins; particularly a $C_{10}^+$ distillate can be formed. The distillate can be further refined and upgraded to high quality fuels, and other products such as diesel fuel, jet fuel, lubes and specialty solvents, particularly premium middle distillate fuels of carbon numbers ranging from about $C_{10}$ to about $C_{20}$.

U.S. Pat. No. 4,579,986 discloses that synthesis gas is subjected to Fischer-Tropsch synthesis over a $Co/Zr/SiO_2$ catalyst and the $C_{20}^+$ fraction of the synthesized product is converted into linear $C_{10}$–$C_{20}$ olefins by mild thermal cracking.

More recently, U.S. Pat. No. 6,274,029 discloses diesel fuels or blending stocks having excellent lubricity, oxidative stability and high cetane number are; produced from non-shifting Fischer-Tropsch processes by separating the Fischer-Tropsch product into a lighter and heavier fractions, e.g., at about 370° C., subjecting the 370° C.+ fraction to hydro-treating, and combining the 370° C.+ portion of the hydrotreated product with the lighter fraction that has not been hydrotreated.

Venter and Vannice (J. Catal., 1987, 103:450; Catal. Lett., 1990, 7:219; J. Phys. Chem., 1992, 96:9944) disclose that the higher activity and $C_2$–$C_4$ olefins selectivities were observed over an activated carbon supported iron based catalyst promoted by manganese and potassium promoters.

The synthesis of hydrocarbons from carbon monoxide and hydrogen in liquid phase slurry containing a catalyst has been performed in the past. Although it permits very good control of the reaction temperatures, the use of slurry of catalyst in a liquid phase for this reaction generally has necessitated an additional step for the separation of the product from the catalyst and the use of modest space velocities.

Thus far, no one has disclosed a metal-containing activated carbon catalyst for use in a liquid phase system which affords improved yields of diesel fuels from the reaction between carbon monoxide and hydrogen, which minimizes the need for an additional step for the separation of product from the catalyst and which permits the use of high space velocities.

Clean diesel fuels that contain no or nil sulfur, nitrogen, or aromatics, are, or will likely be in great demand as diesel fuel or in blending diesel fuel. Clean diesel fuels having relatively high cetane number are particularly valuable. Typical petroleum derived distillates are not clean, in that they typically contain significant amounts of sulfur, nitrogen, and aromatics, and they have relatively low cetane numbers. Clean diesel fuels can be produced from petroleum based distillates through severe hydrotreating at great expense. The production of clean, high cetane number distillates from Fischer-Tropsch waxes has been discussed in the open literature, but few literatures that reported the catalyst which can directly convert synthesis gas to diesel distillates with high quality have appeared.

This invention will first show that the diesel distillates with sulfur-free, nitrogen-free or aromatics-free can be synthesized from synthesis gas over an activated carbon supported cobalt based catalyst that cut off the heavier end of the Schultz-Flory distribution.

SUMMARY OF THE INVENTION

An activated carbon supported cobalt based catalysts containing a Group IVB metal promoter, e.g., Ti, Zr, or Group IIIB metal promoter e.g., La, Ce, or Group VIII metal promter, e.g., Ru, Rh, Pt, wherein the weight ratio of Co: Activated carbon component is 0.05 to 0.4, exhibit enhanced activity and selectivity toward diesel fuels during Fischer-Tropsch synthesis. These catalysts also maintain high $C_{10}$–$C_{20}$ hydrocarbons selectivity under slurry reaction conditions.

In accordance with this invention, a clean distillate being useful as a diesel fuel or as a diesel fuel blend stock and having a cetane number of at least about 60, preferably at least about 70, is produced, preferably direct from synthesis gas through Fischer-Tropsch process over an activated carbon supported cobalt based catalyst. In particular, there is provided a process for preparing directly diesel distillates from synthesis gas over modified Fischer-Tropsch catalysts.

DESCRIPTION OF THE PREFERRED EMBODIMENT

The active catalyst is prepared from an activated carbon supported cobalt containing metal phase, wherein the Co:Activated Carbon weight ratio is about 0.05 to 0.4, promoted by zirconium- or cerium-containing oxide phase or promoted by ruthenium-containing metal phase. Catalysts derived from nitrate salts wherein the total Co:Activated Carbon weight ratio is in the specified range are expected to give acceptable performance, although it is preferred to operate with a single phase catalyst precursor so as to preclude any irregular behavior in subsequent activation procedures.

A preferred activated carbon carrier has a surface area in the range of about 200–2000 m$^2$/g, preferably 800–1500 m$^2$/g, and pore volume of 0.3 to 2.0 ml/g, preferably 0.35 to 0.75 ml/g, distribution of pore diameter of 4 to 1000 Å, preferably 5 to 500 Å, bulk density of about 0.1 to 1.0 g/ml, preferably 0.3 to 0.6 g/ml, and side crushing strength of about 0.08 to 3.0 kg/mm.

The preferred catalysts comprise a Group VIII non-noble metal, e.g. cobalt, iron and nickel, in conjunction with a Group IVB metal promoter, e.g., zirconium, titanium, and a Group IIIB metal promoter, e.g., cerium, lanthanum, or Group VIII metal promoter, e.g., ruthenium, platinum, rhodium, supported on a porous support. The support is preferably an activated carbon, which is made from almond core, cocoanut shell, palm tree wood, or coal.

Group IVB metal promoter, e.g., Zr, or Group IIIB metal promoter e.g., Ce, or Group VIII metal promoter, e.g., Ru, may be added to the activated carbon carrier before impregnating cobalt component or by co-impregnating with cobalt component, the cobalt preferably being doped as a solution of the nitrate salt, while the zirconium or cerium preferably being added as a solution of the nitrate salt although their other compounds such as sulfates may be used, and the ruthenium metal preferably being added as a solution of the chloride.

The catalyst is prepared by co-impregnating or stepwise-impregnating the metals from solutions onto the support, drying at room temperature for several days, then at 80 to 90° C. for 8 hours, and finally at 110 to 120° C. for 10 hours.

The cobalt metal is present in the amount of about 20 wt % or less, preferably 5–15 wt %, while the Group IVB or IIIB or VIII metal promoter is usually present in less amount, e.g., 1:2 to about 1:20 ratio respecting the Group VIII non-noble metal.

The activated carbon supported cobalt based catalysts, promoted by zirconium or titanium or cerium or ruthenium metal, is first subjected to a pretreatment procedure comprising exposure of the nitrate to a inert gas of nitrogen for 10 hours at 120 to 180° C., then to reducing gas containing hydrogen or carbon monoxide or mixture thereof. This procedure can be conducted in a separate vessel or in the Fischer-Tropsch reactor. Pretreatment in the reactor is preferred in order to eliminate the need for a potentially costly and sensitive transfer step to the Fischer-Tropsch synthesis reactor. In situ pretreatment is especially preferred when operating the catalyst in a slurry reactor.

The slurry Fischer-Tropsch synthesis process of the present invention may be conducted with from about 2 to 30 wt % or more of the catalyst suspended in liquid phase. The liquid phase usually comprises an inert hydrocarbon that is relatively nonvolatile under reaction conditions. Representative materials include synthetic paraffins with 10 or more carbon atoms or higher molecular weight hydrocarbons generated from the synthesis gas conversion process. Other liquid such as high boiling alcohols, ethers, esters and the like can also be used without departing from the scope of this invention.

A preferred slurry pretreatment procedure involves suspending the catalyst in a relatively non-volatile hydrocarbon phase, introducing hydrogen or synthesis gas comprising hydrogen and carbon monoxide into the two phases mixture and increasing the temperature up to 250–400° C. so as to convert the catalyst to an active phase. The activation procedure can be conducted at pressure ranging from 0.3 to 1.5 Mpa, more preferably from 0.5 to about 1.0 Mpa, hydrogen or synthesis gas volume hourly space velocity within the range of 300 to 1500, the rotate speed of the agitator in the slurry reactor within the range of 300 to 1200 r/min. The preferred Fischer-Tropsch reaction operation conditions include reaction temperature within the range of 120 to 350° C., reaction pressure within the range of 0.5 to 10.0 MPa, volume hourly space velocity of mixture of hydrogen and carbon monoxide within the range of 100 to 1500, the rotate speed of the agitator in the slurry reactor within the range of 400 to 1200 r/min, the mole ratio of hydrogen to carbon monoxide within the range of 1 to 3.

The catalyst of present invention can also be conducted in fixed bed reactor, the pretreatment procedures can be conducted at pressure ranging from 0.3–1.5 Mpa, preferably 0.3–1.0 Mpa, temperature of 200–500° C., hydrogen or synthesis gas volume hourly space velocity of 300 to 1500. The reaction operation conditions include reaction temperature of 120–350° C., reaction pressure of 0.5–10.0 Mpa, volume hourly space velocity of the mixture of hydrogen and carbon monoxide of 100–1500.

The Fischer-Tropsch synthesis process using the catalyst described herein produces primarily liquid, that is, $C_5^+/C_4^-$ product ratio is at least about 4/1, preferably at least about 6/1 and usually about 5/1 to 10/1. Of the liquid product the $C_{10}$–$C_{20}$/$C_5$–$C_9$ paraffins ratio may range from about 1.5:1 to 3.0/1, usually 1.8:1 to 2.5:1.

An activated carbon supported cobalt based catalyst of this invention produces paraffins of $C_5$ to $C_{21}$ in the liquid oil phase, most of paraffins are fell in the range of $C_{10}$ to $C_{19}$, and no hydrocarbons with the carbon atom number higher than 21 were found during the test on stream of more than 1100 hours. It is believed that the shape selectivity of the pore size of Fischer-Tropsch catalyst restricts the wax formation, so the distribution of products deviates from Schultz-Folry distribution.

Diesel fuels produced from the Fischer-Tropsch synthesis process described herein generally have high cetane number, usually 50 or higher, preferably at least about 60, more preferably at least about 70.

The product of this invention may be directly used as a diesel fuel, or blended with other less desirable petroleum or hydrocarbon containing feeds of about the same boiling range. When used as a blend, the product of the invention can be used in relatively minor amounts, e.g., 10% or more, to improve significantly the final blended diesel product. Although, the product of this invention will improve almost any diesel product, it is especially desirable to blend this product with refinery diesel streams of low quality. Typical streams are raw or hydrogenated catalytic or thermally cracked distillates and gas oils.

EXAMPLE 1

20 grams of activated carbon carrier made from an almond core was washed three times with boiling deionized water, and then dried at 180° C. for 12 hours. A solution of cobalt salt was prepared by dissolving 10.97 grams Co(NO$_3$)$_2$.6H$_2$O in 30 ml deionized water. The supported cobalt catalyst was prepared by impregnating the activated carbon carrier (size 20–40 mesh) described herein with the solution of the cobalt salt under the vacuated conditions (about 0.01 Mpa), drying first at room temperature for several days, then at 90° C. for 8 hours, and finally at 120° C. for 10 hours in a flow of nitrogen to avoid firing.

EXAMPLE 2

15 grams of the activated carbon pretreated according to washing procedure used in Example 1 was added 24 ml of deionized water containing 1.67 grams of dissolved $Zr(NO_3)_4 0.5H_2O$ by the incipient wetness impregnation procedure under vacuated conditions followed by drying at 110° C. for 8 hours. Then, 13.39 grams of $Co(NO_3)_2 0.6H_2O$ dissolved in 17 ml of deionized water was added by the incipient wetness impregnation procedure under vacuated condition, and the resulting material was dried at room temperature for several days, then at 90° C. for 8 hours, and finally at 120° C. for 10 hours in a flow of nitrogen to avoid firing.

EXAMPLE 3

15 grams of the activated carbon pretreated according to washing procedure used in Example 1 was added 25 ml of deionized water containing 1.12 grams of dissolved $Ce(NO_3)_3 0.6H_2O$ by the incipient wetness impregnation procedure under vacuated condition followed by drying at 110° C. for 8 hours. Then, 13.40 grams of $Co(NO_3)_2 0.6H_2O$ dissolved in 17 ml of deionized water was added by the incipient wetness impregnation procedure under vacuated condition, and the resulting material was dried at room temperature for several days, then at 90° C. for 8 hours, and finally at 120° C. for 10 hours in a flow of nitrogen to avoid firing.

EXAMPLE 4

15 grams of the activated carbon pretreated according to washing procedure used in Example 1 was added 24 ml of deionized water containing 10.159 grams of dissolved $Co(NO_3)_2 0.6H_2O$ and 0.22 grams of $KNO_3$ in 20 ml deionized water by the incipient wetness impregnation procedure under vacuated condition followed by drying at room temperature for several days, then at 90° C. for 8 hours, and finally at 120° C. for 10 hours in a flow of nitrogen to avoid firing.

EXAMPLE 5

15 grams of the activated carbon pretreated according to washing procedure used in example 1 was added 24 ml of deionized water containing 1.71 grams of dissolved $Zr(NO_3)_4 0.5H_2O$ by the incipient wetness impregnation procedure under vacuated condition followed by drying at 110° C. for 8 hours. Then, 13.46 grams of $Co(NO_3)_2 0.6H_2O$ and 0.187 grams $RuCl_3$ dissolved in 18 ml of deionized water was added by the incipient wetness impregnation procedure under vacuated condition, and the resulting material was dried at room temperature for several days, then at 90° C. for 8 hours, and finally at 120° C. for 10 hours in a flow of nitrogen to avoid firing.

EXAMPLE 6

A series of comparative performance tests were conducted with 12 grams samples of the catalysts (more than 200 mesh) from Example 1, 2 and 5. The catalyst was charged together with 450 ml of paraffin liquid (boiling point at least higher than 350° C. under atmospheric pressure) to a 1 liter Parr CSTR reactor. Hydrogen was first fed at a rate of 340 ml/min into the reactor at 1.0 Mpa, the reduction temperature was controlled at 380° C., and the rotate speed of the agitator in the slurry reactor was set up to 700 r/min. Reduction was conducted for 20 hours. After reduction, the temperature was cooled down to 200° C., then synthesis gas ($H_2$:CO=2:1) was introduced at a rate of 170 ml/min into the reactor at 2.5 Mpa, the temperature was raised to 240° C., and the rotate speed of the agitator in the slurry reactor was adjusted to 800 r/min. An additional 20 ml/min. of nitrogen was fed into the reactor as the internal standard for subsequent analytical tests. The results of experiments were shown in table 1.

EXAMPLE 7

Comparative tests catalysts (20–40 mesh) from Example 1, 2, 3, 4 and 5 were run in a ($\phi$30×6×420 stainless steel fixed bed reactor to determine the effect of different promoters on diesel fuels synthesis performance under the test conditions similar to those used in Example 6. In each run listed below, 3 grams sample of catalyst was placed in the center of the reactor, and the rest space of fixed bed was filled with 20–40 mesh inert silica beads. After a 10 hour activation period under the condition of reduction temperature of 400° C., reduction pressure of 0.5 Mpa and hydrogen volume hourly space velocity of 1000 $h^{-1}$, the reactor was run under the same process condition as that used in Example 6. The results shown in table 1 shows that the Zr and Ru promoters must be present individually or together in order to achieve the high activity, low selectivity toward $C_1$~$C_4$ hydrocarbons and high selectivity toward diesel distillates in a single catalyst system.

TABLE 1

Results of Fischer-Tropsch reaction over activated carbon supported cobalt based catalysts.

| Catalyst | Type of reactor | CO conversion, % | Yield, g/Nm³-sys | | Distribution in paraffins, % | | | Distribution in oil liquid, % | |
|---|---|---|---|---|---|---|---|---|---|
| | | | $C_1^+$ | $C_5^{30}$ | $C_1$ | $C_{2-4}$ | $C_5$ | $C_{4-9}$ | $C_{10-20}$ |
| Example 1 | Slurry | 55.6 | 120.2 | 96.0 | 8.4 | 11.6 | 80.0 | 34.3 | 65.7 |
| | Fixed bed | 53.8 | 105.9 | 89.4 | 8.7 | 12.0 | 79.3 | 36.8 | 63.2 |
| Example 2 | Slurry | 85.7 | 169.4 | 138.7 | 8.8 | 9.3 | 81.9 | 34.3 | 65.7 |
| | Fixed bed | 64.1 | 138.4 | 111.6 | 8.5 | 10.8 | 80.7 | 37.1 | 62.8 |
| Example 3 | Fixed bed | 78.3 | 162.5 | 108.7 | 18.1 | 15.0 | 66.9 | 60.8 | 39.2 |
| Example 4 | Fixed bed | 41.6 | 84.3 | 66.3 | 4.1 | 18.1 | 77.8 | 62.8 | 37.2 |
| Example 5 | Slurry | 83.5 | 169.6 | 140.9 | 7.8 | 9.1 | 83.1 | 32.5 | 67.5 |
| | Fixed bed | 67.3 | 132.3 | 105.8 | 7.8 | 9.1 | 83.1 | 35.9 | 64.1 |

What is claimed:

1. An activated carbon supported cobalt based catalyst, comprising a substantially high dispersion of at least one of a zirconium component, an cerium component, a ruthenium component or potassium component in a porous carbon matrix and elemental cobalt either deposited thereon or substantially uniformly dispersed therein, wherein the concentration of activated carbon in the catalyst is from 20 to 90 percent by weight, based on the weight of the catalyst, the concentration of elemental cobalt in the catalyst is from 1 to 50 percent by weight, based on the weight of the catalyst, the total concentration of the zirconium component, the cerium component, the ruthenium component, the potassium component, or a combination thereof in the catalyst is from 0.1 to 40 percent by weight, based on the weight of the catalyst and calculated as the elemental metal or metals, and each of the zirconium, cerium, ruthenium or potassium components that is present is in the form of the elemental metal, its oxide or a combination thereof.

2. The catalyst of claim 1, wherein the activated carbon carrier in the catalyst is made from almond core, cocoanut shell, palm tree wood, or coal.

3. The catalyst of claim 1, wherein the activated carbon carrier has surface area in the range of 200–2000 $m^2/g$, pore volume of 0.3 to 2.0 ml/g, distribution of pore diameter of 4 to 1000 fir.

4. The catalyst of claim 3, wherein the activated carbon carrier has surface area in the range of 800–1500 $m^2/g$, pore volume of 0.35 to 0.75 ml/g, distribution of pore diameter of 5 to 500 A.

5. The catalyst of claim 1, wherein the concentration of elemental cobalt in the catalyst is from 1 to 40 percent by weights, based on the weight of the catalyst.

6. The catalyst of claim 5, wherein the concentration of elemental cobalt in the catalyst is from 5 to 25 percent by weights, based on the weight of the catalyst.

7. The catalyst of claim 1, wherein the total concentration of the zirconium component, the cerium component, or combination thereof in the catalyst is from 0.1 to 30 percent by weight, based on the weight of the catalyst and calculated as the elemental metal or metals.

8. The catalyst of claim 7, wherein the total concentration of the zirconium component, the cerium component, or combination thereof in the catalyst is from 0.5 to 10 percent by weight, based on the weight of the catalyst and calculated as the elemental metal or metals.

9. The catalyst of claim 1, wherein the total concentration of the potassium component, ruthenium component, or a combination thereof in the catalyst is from 0.01 to 10 percent by weight, based on the weight of the catalyst and calculated as the elemental metal or metals.

10. The catalyst of claim 9, wherein the total concentration of the potassium component, ruthenium component, or a combination thereof in the catalyst is from 0.1 to 1 percent by weight, based on the weight of the catalyst and calculated as the elemental metal or metals.

11. The preparation process of the catalyst of claim 1, comprising:
   (1) co-impregnating or stepwise-impregnating the metals from solutions of metals nitrates or carbonates or carbonyls onto the support under vacuated conditions,
   (2) drying at room temperature for several days, then at 80 to 90° C. for 8 hours, and finally at 110 to 120° C. for 10 hours, and
   (3) reducing by a flow of hydrogen at reduction temperature within the range of 100 to 700° C. for reduction period within the range of 1 to 50 hours.

12. The process of claim 11, wherein said vacuated conditions may be within down to 80 kPa.

13. A method for direct synthesis of diesel distillates with paraffins having carbon numbers less than 25 as principal distillates from a synthesis gas through a Fischer-Tropsch synthesis, comprising:
   contacting the synthesis gas with a catalyst comprising a substantially high dispersion of at least one of a zirconium component, a cerium component, a ruthenium component or a potassium component in a porous carbon matrix with elemental cobalt either deposited thereon or substantially uniformly dispersed therein, wherein the concentration of activated carbon in the catalyst is from 20 to 90 percent by weight, based on the weight of the catalyst, the concentration of elemental cobalt in the catalyst is from 1 to 50 percent by weight, based on the weight of the catalyst, the total concentration of the zirconium component, the cerium component, the ruthenium component, the potassium component, or a combination thereof in the catalyst is from 0.1 to 40 percent by weight, based on the weight of the catalyst and calculated as the elemental metal or metals, and each of the zirconium, cerium, ruthenium or potassium components that is present in the form of the elemental metal, its oxide or a combination thereof.

* * * * *